United States Patent [19]

Weis

[11] 4,226,604
[45] Oct. 7, 1980

[54] METHOD AND APPARATUS FOR PREVENTING OVERHEATING OF THE SUPERHEATED VAPORS IN A SOLAR HEATING SYSTEM USING A REFRIGERANT

[75] Inventor: Frederick A. Weis, Englewood, Colo.

[73] Assignee: Solar Specialties, Inc., Denver, Colo.

[21] Appl. No.: 38,399

[22] Filed: May 14, 1979

[51] Int. Cl.³ .................. F25B 27/00; F25B 27/02; F25D 41/00
[52] U.S. Cl. .................................. 62/2; 62/238; 62/196 R; 62/197; 165/48 S
[58] Field of Search ............... 165/48 S; 62/2, 238 E, 62/324 D, 196 R, 197

[56] References Cited

U.S. PATENT DOCUMENTS

| | | | |
|---|---|---|---|
| 2,689,090 | 9/1954 | Wetherbee et al. | 62/2 |
| 2,693,939 | 11/1954 | Marchant et al. | 62/2 |
| 3,242,679 | 3/1966 | Puckett et al. | 62/2 |
| 3,396,550 | 8/1968 | Cawley | 62/196 R |
| 3,435,627 | 4/1969 | Castillo | 62/197 |
| 4,163,369 | 8/1979 | Owen | 62/2 |
| 4,179,894 | 12/1979 | Hughes | 62/2 |

Primary Examiner—Lloyd L. King
Attorney, Agent, or Firm—Edwin L. Spangler, Jr.

[57] ABSTRACT

This invention relates to an improved method and apparatus for preventing overheating of the superheated vapors in a solar heating system using a refrigerant to collect heat from the atmosphere, the improvement consisting of sensing the amount of superheat contained in the superheated vapors leaving the collector and if an overheated condition is detected, bleeding off a portion of the refrigerant mixture entering the collector and mixing it with the overheated vapors to cool them down before they enter the compressor. The apparatus involved includes a thermostatic expansion valve responsive to the temperature of the superheated vapors leaving the collector and associated piping operative upon actuation to bypass a portion of the refrigerant mixture entering the collector around the later and mix it with the overheated vapors before they reach the compressor. The invention also encompasses the use of the improved desuperheating method and apparatus outlined above in such a way that it only becomes functional and operative when the conventional solar system is already activated to deliver the full charge of refrigerant mixture to the collectors.

9 Claims, 1 Drawing Figure

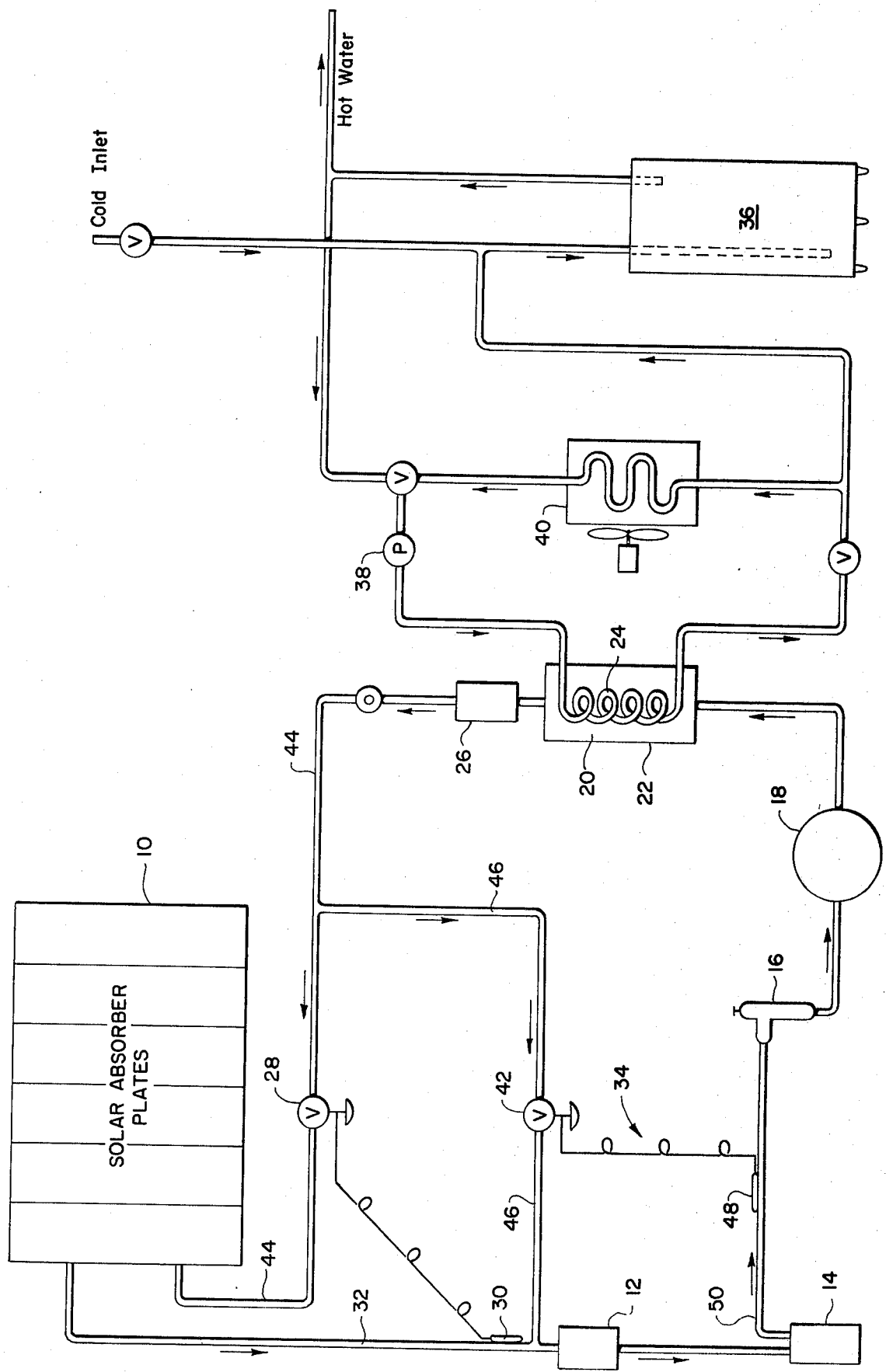

METHOD AND APPARATUS FOR PREVENTING OVERHEATING OF THE SUPERHEATED VAPORS IN A SOLAR HEATING SYSTEM USING A REFRIGERANT

Active heat collection systems using a refrigerant to strip heat from the atmosphere even under subambient conditions are well known in the prior art. Unfortunately, those designed with sufficient heat collection capacity to satisfy the heat demands under minimal conditions of short, cold, sunless days are prone to overheat and cause serious problems during prolonged periods of bright sunshine. Under such conditions, vapor which ideally enters the compressor at somewhere around 75°–80° F., enters some at temperatures that often exceed 100° F. causing serious problems, a few of which will be outlined presently.

Among the prior art attempts to solve this overheating problem has been that of simply providing the compressor with an over-temperature cutout operative to shut it down when the vapor being supplied thereto is so hot that it is incapable of adequately cooling the compressor's motor winding. Overheating protection such as this works reasonably satisfactorily on an occasional basis; however, it is not designed or intended to function on a frequent or regular basis. When it is called upon to do so, therefore, and it often is in hot climates, the net result is to either burn out the compressor altogether or at least severely damage it. Overheating of a magnitude that causes the compressor to cycle even a couple of times a day is ofter enough to damage it severely since it is said that in excess of 90% of the wear occurs during start-up.

An analogous and almost as serious a problem is that of operating the compressor for long periods of time at elevated temperatures higher than those at which it is designed to function best, yet still below the cutout temperature. When this occurs the valves wear excessively, particularly the discharge valves. Sustained operation at these high temperatures, say 300°–500° F., also causes the oil to degrade and lose its lubricating properties as well as decompose to form wax and other contaminants that gum up the critical thermostatic expansion valve.

Another way that is sometimes used to control the overheating of the compressor is that of simply burying the feed line in the ground so that the gas would enter the compressor somewhere near that of the soil in which the line is burned, that is generally between 50°–75° F. depending upon the season of the year and the particular climatic conditions involved. Whatever heat is stripped in this manner is, of course, lost to the system thus reducing its overall efficiency. Moreover, while this approach may work reasonably well in a ground-mounted system, it is not only impractical but somewhat less efficient and more expensive in a roof-mounted one due to the longer lines required, heat losses, etc.

The only other attempt at solving this overheating problem known to applicant is that of running the cold liquid line to the collectors and the hot gas line to the compressor in heat exchange relation to one another. In theory, this is a good solution but in practice it has proven to be totally unsatisfactory due to the uncontrolled variables involved, all of which have a pronounced effect upon the temperature of the gas being fed to the compressor. In other words, in the absence of any control over the temperature of the liquid and gas passing in heat exchange relation to one another, whatever else is done in terms of insulation, efficient heat transfer, etc., become largely meaningless.

It has now been found in accordance with the teaching of the instant invention that there is, in fact, a way of effectively preventing overheating while, at the same time, conserving the heat within the system to thus optimize its efficiency, specifically, the overheated condition is sensed and the sensor employed to actuate a control valve which bypasses a portion of the liquid/gas mixture being returned to the collector and mixes same with the superheated vapor feeding the compressor so that the temperature of the latter lies within preselected acceptable limits. The valve is a standard thermostatic expansion valve of the same exact type used elsewhere in this type of system only smaller.

The improved system forming the subject matter hereof has as its prime advantage the protection of the compressor within resorting to shutting it down or wasting heat scavanged from the atmosphere by the collectors. While this is its main advantage, there are others that assume a good deal of significance. For instance, the instant bypass system is only operative when the main thermostatic expansion valve is all the way open and hot gas containing an excess of superheat is leaving the collectors. At all other times the bypass system is shut down.

Of perhaps even greater significance is the fact that the collectors can be sized to deliver the heat required under the worst of adverse conditions without giving any particular thought to the problem of overheating the compressor by reason of these same overly large heat collection surfaces.

Accordingly, it becomes the principal object of the present invention to provide a novel and improved method and apparatus for protecting the compressor in a refrigerated solar heating system from the adverse effects of an excessive amount of superheat in the superheated vapor being fed thereto.

A second objective is to provide an apparatus of the class described wherein the control valve used to bypass a portion of the liquid-vapor mixture being returned to the collectors comprises a conventional thermostatic expansion valve of the same type used elsewhere in the system and differing therefrom only in that it is smaller.

Another objective is the provision of a system of the type aforementioned wherein the total excess heat energy available in the form of superheat in the overheated vapor is conserved and not wasted.

Still another object is that of providing an apparatus for limiting the superheat in a superheated vapor being fed to the compressor of a solar refrigeration system which apparatus becomes functional only under abnormal conditions when the main thermostatic expansion valve is all the way open.

An additional object is to provide a desuperheating method and apparatus that are readily adaptable to conventional refrigerated solar systems with comparable results.

Further objects are to provide means for controlling the excess superheat contained in superheated vapors being fed to the compressor of a refrigerated solar system which is simple, inexpensive, versatile, reliable, compact, safe and highly efficient.

Other objects will be in part apparent and in part pointed out specifically hereinafter in connection with the FIGURE of drawings that shows the improved refrigerated solar system in schematic form.

Referring next to the drawing for a detailed description of the instant invention, the desuperheater has been illustrated in operative association with a conventional active heat collection system of the type using a refrigerant such as R-12 so as to strip heat from the atmosphere under even subambient conditions. In the particular form illustrated, it includes one or more collectors 10 which take heat from the atmosphere and use it to vaporize a mixture of refrigerant containing approximately 70% liquid and 30% vapor in equilibrium. Under ordinary operating conditions, the refrigerant leaves the collectors in the form of a superheated vapor containing, ideally, some 8°-10° of superheat. A typical "suction temperature", i.e. vapor temperature on the discharge side of the collectors might be 40° F. although temperatures approaching 75°-80° F. can be tolerated without adverse effect.

After passing through a suction filter 12, the superheated vapor enters an accumulator 14 from which it is withdrawn through a crankcase pressure regulator 16 preparatory to entering compressor 18. As the compressed vapor leaves the compressor, it is shown entering the receiver 20 of a coil-in-shell combination condenser/receiver 22 where it passes in heat exchange relation to water spiralling through coil 24 thereof. The water, of course, takes heat from the vapor which then condenses upon the outside of the coil 24 and drops down into the bottom of the receiver where the resulting condensate returns to the collectors as a liquid-vapor mixture through filter 26 and main thermostatic expansion valve 28. This thermostatic expansion valve, or so-called "TX" valve, is controlled through pressure generated in a sensor 30 that responds to the temperature in main suction line 32, more about which will be said later since the desuperheating apparatus of the present invention that has been indicated in a general way by reference numeral 34 closely parallels in both structure and operation that of the TX valve and its associated control sensor 30. Suitable TX valves are models PSE3FW and IFE-3-C marketed by Parker Hanifen Corporation and Sporlan Valve Company, respectively.

While forming no part of the present invention, the refrigerated solar system just described has been shown in operative association with a household hot water system of the general type having a hot water tank 36 heated directly by the hot water pumped through coil 24 by water pump 38. Hot water from the coil 24 is also fed through a space heater coil 40 contained within a separate circuit.

All of the above described system is purely conventional; however, as previously mentioned, the function of the TX valve 28 is worth exploring in detail because of its close analogies to the desuperheating valve 42 contained within the desuperheating system 34. Both of these valves 28 and 42 are of standard design and they include a spring-biased diaphragm that responds to the pressure exerted thereon in opposition to that of the spring. The movement of the diaphragm, in turn, actuates a metering valve which regulates the flow through an orifice placed in the particular line being controlled thereby. In the case of TX valve 28, the temperature of the vapor leaving the collectors 10 through suction line 32 is used to regulate the amount of fluid-vapor mixture that is allowed to return to the collectors through line 44, i.e. the colder the vapor temperature, the less superheat it contains and the less liquid-vapor mixture that is admitted to the collectors through TX valve 28 since so little heat is available from the atmosphere to vaporize it. As will be seen presently, under these conditions, the desuperheating system 34 is completely inoperative which, of course, is not true of those prior art systems which take suction line 32 underground or strip heat from the hot vapors flowing through it in some other way because these systems operate continuously whether needed or not.

The condition which activates the desuperheating system is that in which the TX valve is wide open to circulate th maximum amount of refrigerant through the collectors yet, despite this fact, the circulation is inadequate to handle the excess heat load and the vapor becomes overheated. Sensor 30 might be set, for example, to actuate TX valve wide open when the superheat contained in the vapor in line 32 is somewhere around 8°-10°. Once this condition has been reached, however, TX valve 28 has reached its limit and the conventional system can do nothing more than shut down the compressor to alleviate the overheating condition.

In accordance with the teaching found herein, this condition is handled in an entirely different way by the desuperheater system already identified by reference numeral 34. Functionally, the elements of system 34 are the same as those already described in connection with main thermostatic expansion valve 28, namely, a branch line 46 for carrying the liquid-vapor refrigerant mixture, a sensor 48 for sensing the temperature of the hot superheated vapor in suction line 32, and the desuperheating valve 42 that controls the flow in branch line 46. Sensor 48 is set between two operating parameters, specifically, a minimum tolerable amount of superheat in the vapor in excess of that sensed by sensor 30 and a predetermined maximum amount of superheat to be left in the hot vapor being delivered to the compressor 18 through line 50 downstream of accumulator 14. By way of example, if sensor 30 is set to fully open TX valve 28 when the superheat in the vapor reaches 5°-10°, then sensor 48 might be set to fully open desuperheater valve 42. One valve which functions quite well as the desuperheating valve 42 is that marketed by Parker Hanifen under No. N2FW. Sporlan Valve Company makes a comparable valve which is best described as a quarter-sized version of its TX valve IFE-3-C.

The effect of the desuperheating system on the main system is one of limiting the amount of superheat in the hot superheated vapor entering the compressor while, at the same time, conserving the excess heat energy. This takes place in the following way. To start with, if sensor 30 determines the vapor in line 32 has too little superheat, it closes the TX valve to the degree necessary to limit the flow of refrigerant back to the collectors until the superheat contained in the vapor reaches the prescribed level. In essence, therefore, sensor 30 modulates the TX valve to maintain, say 5°-10° superheat. All this time, sensing bulb 48 has not sensed a condition (15°-30° superheat) which requires that the desuperheating valve 42 open at all. When it does sense such a condition, it will function to open valve 42 and bleed off a portion of the refrigerant in the liquid-vapor state upstream of TX valve 28 and bypass it around the collectors directly into suction line 32. As previously noted, this refrigerant will be at equilibrium and contain somewhere around 70% liquid and the rest vapor. The excess superheat contained in the hot superheated vapor will flash some portion of the liquid in the liquid-vapor mixture being bypassed thereto thus cooling down the overheated vapors but retaining all the heat values. Within the 15°–30° superheat limit set on the desuperheater valve, sensor 48 will control the latter by letting as much refrigerant bypass the collectors as is required to maintain this condition.

The unique method for limiting the amount of superheat in the hot superheated vapors being fed to the compressor consists, first of all, of preselecting a maximum superheat limit which is above that which can be maintained with the maximum flow of refrigerant through the collectors. Secondly, that portion of the liquid-vapor refrigerant mixture entering the collectors is bypassed around the latter and mixed directly with the overheated vapors issuing therefrom that is required to cool the same down to the preselected superheat value by using that excess superheat contained therein over and above this preselected value to vaporize the liquid constituent of the refrigerant thus bypassed.

What is claimed is:

1. In a solar heating system wherein a mixture of refrigerant in liquid and vapor form is circulated through a solar collector which takes heat from the atmosphere to convert the refrigerant to a superheated vapor preparatory to delivering it to a compressor, and wherein means responsive to the temperature of the superheated vapor leaving the collector is employed to control the amount of the mixture admitted to the latter, the improved method for reducing any excess superheat contained in the superheated vapors which comprises: sensing the degree of superheat contained in the superheated vapors entering the compressor, using any excess of superheat detected above a preselected maximum as an input operative to actuate means connected to bypass the refrigerant mixture around the collector and mix same directly with the overheated vapors, and employing the refrigerant mixture thus bypassed to cool down the overheated vapors to the preselected maximum temperature chosen for the superheated vapors being fed to the compressor.

2. The improved method as set forth in claim 1 wherein none of the refrigerant mixture is bypassed around the collector before the means controlling delivery thereof to said collector is fully open.

3. The improved method as set forth in claim 1 wherein the preselected maximum superheated vapor temperature is set at a level higher than that chosen to control admission of the refrigerant mixture to the collectors.

4. The improved method as set forth in claim 1 wherein the preselected maximum amount of superheat permitted in the vapor is between approximately 15° and 30°F.

5. The improved method as set forth in claim 1 wherein the preselected maximum temperature of the superheated vapor is set between approximately 5° and approximately 20° F. higher than the chosen temperature at which superheated vapor activates the means for admitting the refrigerant mixture to the collector.

6. In a solar heating system having a solar collector wherein heat is taken from the atmosphere to convert a refrigerant mixture in liquid and vapor form to a superheated vapor for delivery to a compressor, and wherein a first thermostatic expansion valve responsive to the temperature of the superheated vapor leaving the collector is connected to control the amount of refrigerant mixture admitted to the collector, the improved means for limiting the amount of superheat contained in the vapor fed to the compressor which comprises: a bypass line connected to take the refrigerant mixture following condensation thereof out at a point upstream of the first thermostatic expansion valve and convey same around the collector to a point where it is mixed with the superheated vapor upstream of the compressor; and a second thermostatic expansion valve operative in response to a rise in temperature of the superheated vapor above a preselected maximum to bypass that portion of the refrigerant mixture required to maintain said vapor at the preselected temperature upon being mixed therewith.

7. The improved solar heating system as set forth in claim 6 wherein the second thermostatic expansion valve becomes operative to bypass the refrigerant mixture only after the first of said thermostatic expansion valves is fully open.

8. The improved solar system as set forth in claim 6 wherein said second thermostatic expansion valve becomes operative to bypass the refrigerant mixture at a superheated vapor temperature between approximately 5° and approximately 20° F. above the temperature of the superheated vapor at which said first thermostatic expansion valve is fully open.

9. The improved solar collection system as set forth in claim 6 wherein the second thermostatic expansion valve becomes operative to bypass the refrigerant mixture when the superheated vapor contains between approximately 15 and 30 degrees of superheat on the Fahrenheit scale.

* * * * *